(12) United States Patent
Braley et al.

(10) Patent No.: US 8,753,091 B1
(45) Date of Patent: Jun. 17, 2014

(54) COMPOSITE WIND TURBINE BLADE AND METHOD FOR MANUFACTURING SAME

(75) Inventors: Mike S. Braley, Cincinnati, OH (US); Andrew A. Head, Cincinnati, OH (US); Phillip M. Lariviere, Milford, OH (US); Victor M. Ivers, Amelia, OH (US)

(73) Assignee: A&P Technology, Inc., Cincinnati, OH (US)

( * ) Notice: Subject to any disclaimer, the term of this patent is extended or adjusted under 35 U.S.C. 154(b) by 960 days.

(21) Appl. No.: 12/784,320

(22) Filed: May 20, 2010

Related U.S. Application Data

(60) Provisional application No. 60/180,107, filed on May 20, 2009.

(51) Int. Cl.
F03D 11/00 (2006.01)

(52) U.S. Cl.
USPC .......................................... 416/226; 416/230

(58) Field of Classification Search
USPC ............................... 416/224, 226, 229 R, 230
See application file for complete search history.

(56) References Cited

U.S. PATENT DOCUMENTS

| | | | | |
|---|---|---|---|---|
| 3,028,292 | A | * | 4/1962 | Hinds ........................... 156/214 |
| 4,247,258 | A | | 1/1981 | Griffee et al. |
| 4,360,871 | A | | 11/1982 | Blaney |
| 4,408,958 | A | | 10/1983 | Schacle |
| 4,474,536 | A | | 10/1984 | Gougeon et al. |
| 4,692,095 | A | | 9/1987 | Lawson-Tancred |
| 4,732,542 | A | * | 3/1988 | Hahn et al. ..................... 416/226 |
| 4,976,587 | A | | 12/1990 | Johnston et al. |
| 5,332,178 | A | | 7/1994 | Williams |
| 5,456,579 | A | | 10/1995 | Olson |
| 5,474,425 | A | | 12/1995 | Lawlor |
| 5,476,704 | A | * | 12/1995 | Kohler ........................... 428/119 |
| 5,499,904 | A | | 3/1996 | Wallace et al. |
| 6,068,446 | A | | 5/2000 | Tangler et al. |
| 6,139,278 | A | * | 10/2000 | Mowbray et al. ......... 416/229 A |
| 6,231,941 | B1 | | 5/2001 | Cundiff et al. |
| 6,264,877 | B1 | | 7/2001 | Pallu De La Barriere |
| 6,612,810 | B1 | | 9/2003 | Olsen et al. |
| 7,165,945 | B2 | * | 1/2007 | Kovalsky et al. ............. 416/226 |
| 7,179,059 | B2 | | 2/2007 | Sorensen et al. |
| 7,198,471 | B2 | * | 4/2007 | Gunneskov et al. ...... 416/229 R |
| 7,351,040 | B2 | | 4/2008 | Livingston et al. |
| 7,377,752 | B2 | | 5/2008 | Mohamed |
| 7,517,198 | B2 | | 4/2009 | Baker et al. |
| 7,704,024 | B2 | | 4/2010 | Kootstra et al. |
| 7,726,943 | B2 | | 6/2010 | Stommel |
| 2006/0188378 | A1 | | 8/2006 | Bech et al. |
| 2006/0225278 | A1 | | 10/2006 | Lin et al. |
| 2007/0036659 | A1 | | 2/2007 | Hibbard |

(Continued)

*Primary Examiner* — Christopher Verdier
(74) *Attorney, Agent, or Firm* — Hahn Loeser & Parks LLP

(57) ABSTRACT

A wind turbine blade may include a plurality of longitudinal composite members each having a fiber and resin layer around a predetermined cross-sectional shape and each comprising at least one longitudinal outer surface and at least one longitudinal mounting surface, each of the outer surfaces of the plurality of longitudinal composite members corresponding to a different portion of a desired airfoil shape, the plurality of longitudinal composite members assembled such that the outer surfaces of the composite members form at least a majority of the airfoil shape. An outer skin may be provided. The composite members may be made up of transportable segments. A method of assembly may include transporting the segments to a desired location such as an installation site for assembly of the wind turbine blade at the installation site.

11 Claims, 13 Drawing Sheets

(56) References Cited

U.S. PATENT DOCUMENTS

| | | |
|---|---|---|
| 2007/0040294 A1 | 2/2007 | Arelt |
| 2007/0107220 A1 | 5/2007 | Bakhuis et al. |
| 2008/0069699 A1 | 3/2008 | Bech |
| 2009/0068017 A1 * | 3/2009 | Rudling .................. 416/219 R |
| 2009/0070977 A1 | 3/2009 | Livingston |
| 2009/0116966 A1 | 5/2009 | Althoff et al. |

* cited by examiner

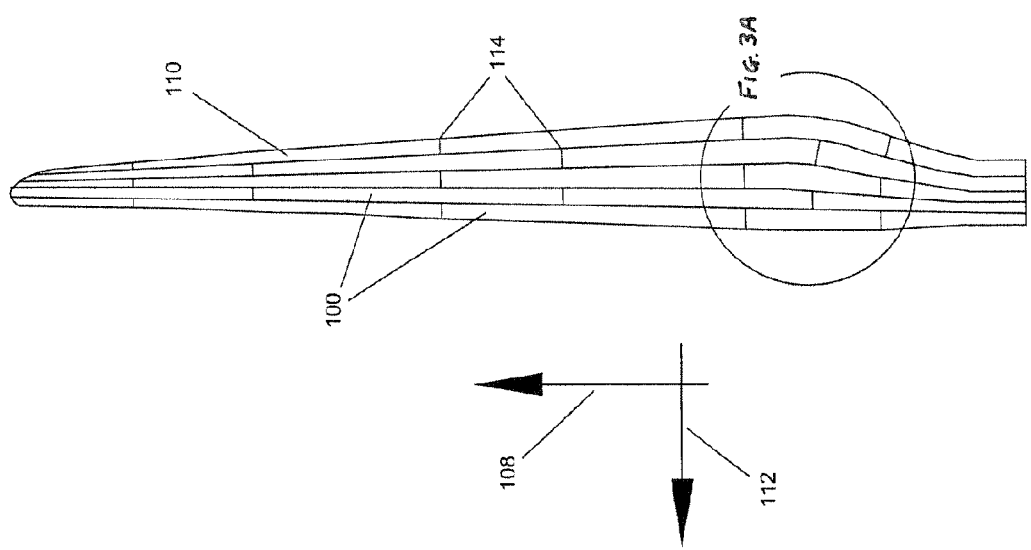

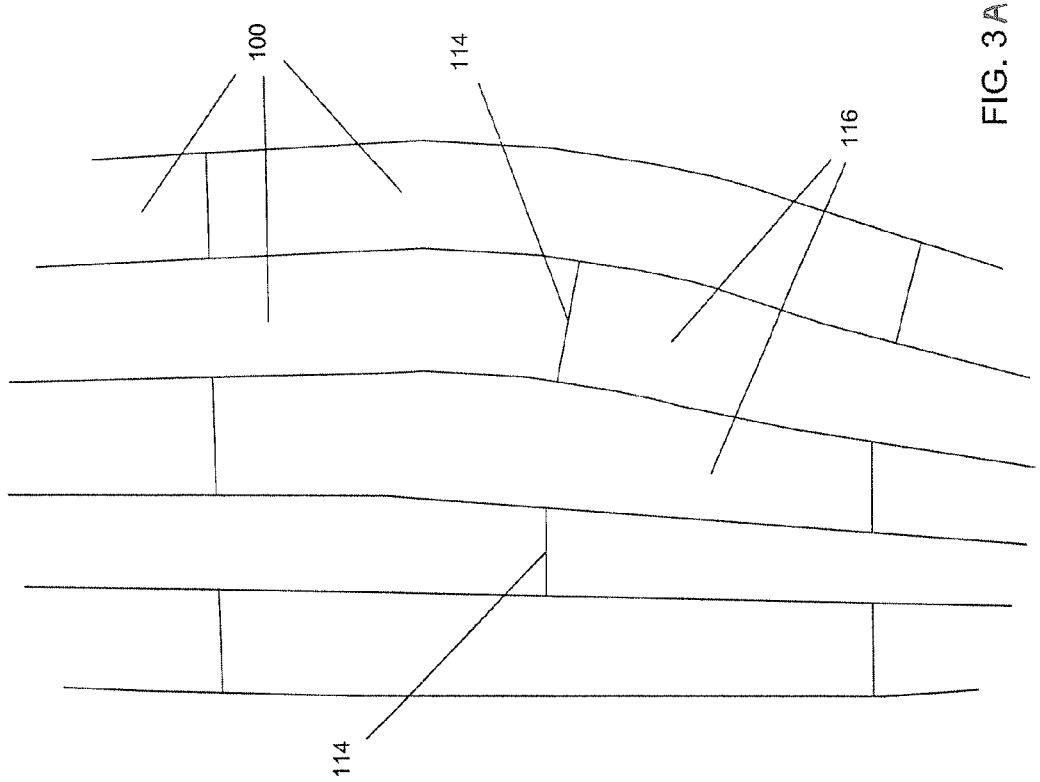

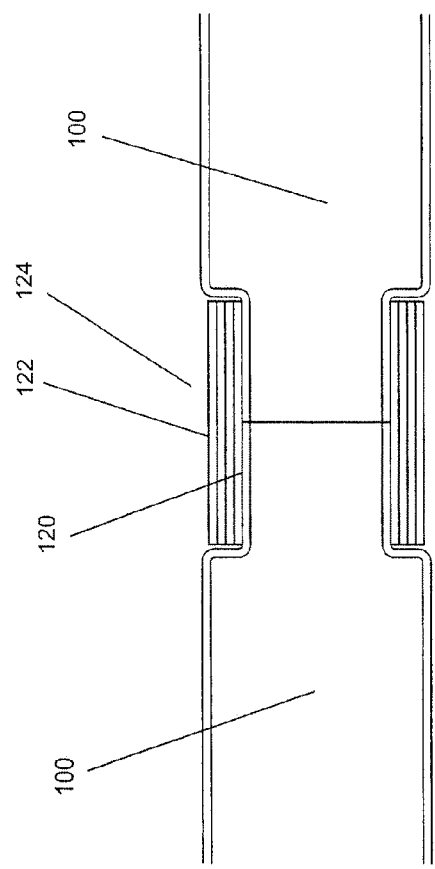

COMPOSITE WIND TURBINE BLADE AND METHOD FOR MANUFACTURING SAME

This application claims the benefit of U.S. Provisional Patent Application Ser. No. 61/180,107, filed May 20, 2009, incorporated herein by reference.

BACKGROUND AND SUMMARY OF THE DISCLOSURE

The present invention is a composite wind turbine blade construction and a method for manufacturing the same. Wind turbines convert kinetic energy in the wind into electrical energy. A typical wind turbine configuration is a three-bladed Horizontal Axis Wind Turbine (HAWT). Turbines of this configuration typically have a rotor with three wind blades with aerodynamic profiles attached to a central hub or rotor. The rotational axis of the rotor is approximately horizontally positioned and movable to be approximately aligned with the direction of the wind. Wind passing over the surfaces of the wind blades generates lift, which the rotor assembly converts to torque. The rotor is connected to a driveshaft extending through the front end of a nacelle, or enclosure. In certain wind turbine designs, a gearbox inside the nacelle increases the angular velocity of the rotation of an output shaft that drives an electrical generator converting the rotary motion into electricity. In alternative wind turbine designs, the driveshaft may operate a hydraulic pump or other hydraulic system to drive the electrical generator. The nacelle and rotor assembly is typically supported by a tower.

The efficiency and cost effectiveness of a HAWT depends in part on the average wind velocity and the area swept by the wind blades as the rotor rotates. As the area swept by the wind blades changes with the length of the blades, the length of commercial wind blades has increased. For higher wind velocity locations, longer wind blades may provide an increased return on investment. For lower wind velocity locations, longer wind blades may be required to provide a commercially viable investment.

Desirable locations for wind turbines are those with high average wind velocities. As the demand for wind power has increased many of the most accessible high average wind velocity locations have been utilized. Continuing demand has made more remote locations attractive despite lack of infrastructure to support transportation of wind turbine components, transport and operation of erection equipment, ongoing maintenance operations and access to existing electrical grids. Consequently, accessible locations with lower average wind velocities are also becoming commercially desirable as demand for wind power increases. The need to effectively utilize remote high average wind velocity locations and accessible lower average wind velocity locations increases the need for longer, larger wind blades.

In the past, the length of the wind blades has been limited by the capabilities of the structure and materials to support the weight of the blades and to withstand static and dynamic loads in service. Additionally, the breadth of the wind blades increases with the increase in length. Longer, wider blades require more material, which increases the weight of the wind blades. The length, breadth and weight increases impose constraints on transportation. In particular, overall dimensions for transport are limited by the quality of access roads, the clearance height of overhead obstructions on the transport path and weight limits on bridges. Transport constraints increase the need for blades of lighter weight materials and blades that can be transported in pieces and/or fabricated on-site while material capabilities drive a concomitant need for higher strength structures and materials.

Typical of many prior composite wind blades is a construction of a box spar assembly having shear webs forming the sides and spar caps forming the upper and lower surfaces. Skin halves are affixed to the upper and lower surfaces and joined at the leading and trailing edges of the wind blade. Thin composite materials in the shear webs, spar caps and skins over lightweight core materials such as balsa or foam materials yield high strength, light weight structures. This prior construction requires molds to form the skin halves. These molds are large, expensive, and subject to the same transportation constraints discussed above, rendering this construction method uneconomical for on-site fabrication of wind blades. Variations of prior methods employing multiple-piece shear web/spar cap spar assemblies and multiple piece skin segments have been proposed.

An alternate prior wind blade construction uses a composite tubular spar affixed to skin halves. Additional shear webs have been used with this construction. However, this construction is subject to the same constraints and economies as conventional shear webs/spar caps/skins construction.

Multiple-piece wind blades where each piece contains core structure and outer skins in a completed subassembly have been proposed for simplified transport and on-site assembly. However, the joints between blade segments of the prior multiple-piece wind blades can be weak points relative to the required service loads. Strengthening of the joints increases material weight and incurs additional ongoing monitoring and maintenance requirements for the blade structure. Additionally, the joints typically are exposed to the environment and prone to wear from the environment, wind-borne particles, and other damage.

Prior one-piece wind blades have attempted to include higher strength fibers in the spars and skins, utilize bend-twist coupled composite structures to reduce lift in extreme wind load conditions, and various static and dynamic aerodynamic modifications to the wind blade surfaces. Additionally, wind blade manufacturers in the past have provided a limited range of fixed wind blade configurations to minimize engineering time and costs, manufacturing tooling and equipment, and to minimize testing for validation. Each configuration was designed to service the widest possible range of wind regimes. As a result, the prior wind turbine blades were rarely optimized to the wind conditions to be experienced by each specific wind turbine installation and not cost efficient for all installations. There remains a need for a wind turbine blade that is efficiently transported and provides efficient and cost effective service over a range of blade lengths and wind regimes. There further remains a need for the capability to optimize the structural properties of a wind blade configuration to a specific installation without resulting in expensive engineering and manufacturing changes.

A wind turbine blade is disclosed comprising a plurality of longitudinal composite members each having a fiber and resin layer around a predetermined cross-sectional shape and each comprising at least one longitudinal outer surface and at least one longitudinal mounting surface, each of the outer surfaces of the plurality of longitudinal composite members corresponding to a different portion of a desired airfoil shape, the plurality of longitudinal composite members assembled such that the outer surfaces of the composite members form at least a majority of the airfoil shape. The mounting surface of one longitudinal composite member may be positioned opposite the mounting surface of an adjacent longitudinal composite member with a fiber and resin layer there between.

The fiber and resin layer of the longitudinal composite members may include a braided sleeve comprising fibers selected from a group consisting of glass fiber, carbon fiber, and a combination thereof. The braided sleeve may comprise fibers having a bias angle in one direction less than the bias angle in the other direction. Alternatively or additionally, the fiber and resin layer of the longitudinal composite members may include a triaxial braided sleeve. The fiber layer of the longitudinal composite members may comprise axial features capable of intermeshing with an adjacent fiber layer in the assembly.

An outer skin may be positioned over the assembly of longitudinal composite members, the outer skin comprising a fiber and resin layer. The fiber in the fiber and resin layer of the outer skin may comprise a continuous, contoured braided sleeve.

The wind turbine blade may include at least one of the plurality of longitudinal composite members having a variable cross section along its length. Alternatively or in addition, each of the longitudinal composite members may comprise a plurality of segments joined end to end. Segments of the longitudinal composite members may be less than about 40 feet in length. In one example, at least one of the segments comprises a constant cross sectional shape along its length.

Also disclosed is a method of manufacturing a wind turbine blade comprising providing a plurality of longitudinal composite members each having a fiber layer around a predetermined cross-sectional shape and comprising at least one longitudinal outer surface and at least one longitudinal mounting surface, each of the outer surfaces of the plurality of longitudinal composite members corresponding to a different portion of a desired airfoil shape, and assembling the plurality of longitudinal composite members such that the outer surfaces of the composite members form a least a majority of the airfoil shape. The method may comprise providing an outer skin over the assembly of longitudinal composite members comprising a fiber and resin layer.

The method may include, prior to the step of assembling the plurality of longitudinal composite members, infusing resin into the fiber layer around each longitudinal composite member, and curing the resin.

In the method, the step of assembling the plurality of longitudinal composite members may comprise infusing resin into the fiber layer around each longitudinal composite member, then assembling the longitudinal composite members such that the mounting surface of one longitudinal composite member is opposite the mounting surface of an adjacent longitudinal composite member with a fiber and resin layer there between, and curing the resin.

The step of providing a plurality of longitudinal composite members may include over-braiding the fiber layer around the predetermined cross-sectional shape.

Where each of the longitudinal composite members comprises a plurality of segments, the method may further comprise the step of assembling the segments to form the plurality of longitudinal composite members. Additionally, prior to the step of assembling the plurality of longitudinal composite members, the method may include the steps of transporting the plurality of segments to a desired location, and assembling the segments to form the plurality of longitudinal composite members at the desired location. The method may comprise providing an outer skin over the assembly of longitudinal composite members comprising a fiber and resin layer.

A kit for making a wind turbine blade may comprise a plurality of segments adapted to be joined end to end to form longitudinal composite members, each having a fiber layer around a predetermined cross-sectional shape and comprising at least one outer surface, each of the outer surfaces of the plurality of longitudinal composite members corresponding to a different portion of a desired airfoil shape, the plurality of longitudinal composite members capable of being assembled such that the outer surfaces of the composite members form at least a majority of the airfoil shape.

The kit may include a fiber layer adapted for enveloping the longitudinal composite members after assembly for forming an outer skin comprising a fiber and resin layer. The fiber layer may be a continuous, contoured braided sleeve.

The longitudinal composite members may be adapted to be assembled by infusing resin into the fiber layer around each of the plurality of longitudinal composite members.

The above summary is not intended to describe each embodiment or every implementation of the present invention. A more complete understanding of the invention and its advantages will become apparent by referring to the following detailed description and claims in conjunction with the accompanying drawings.

BRIEF DESCRIPTION OF THE DRAWINGS

This invention will now be described in further detail with reference to the accompanying drawings, in which:

FIG. 3 is a plan view of an internal structure for a wind turbine blade;

FIG. 3A is a detail of end-to-end joints between longitudinal composite members;

FIG. 7A is a partial cross section of end-to-end joints between longitudinal composite members

DETAILED DESCRIPTION OF THE DRAWINGS

Figure 1:
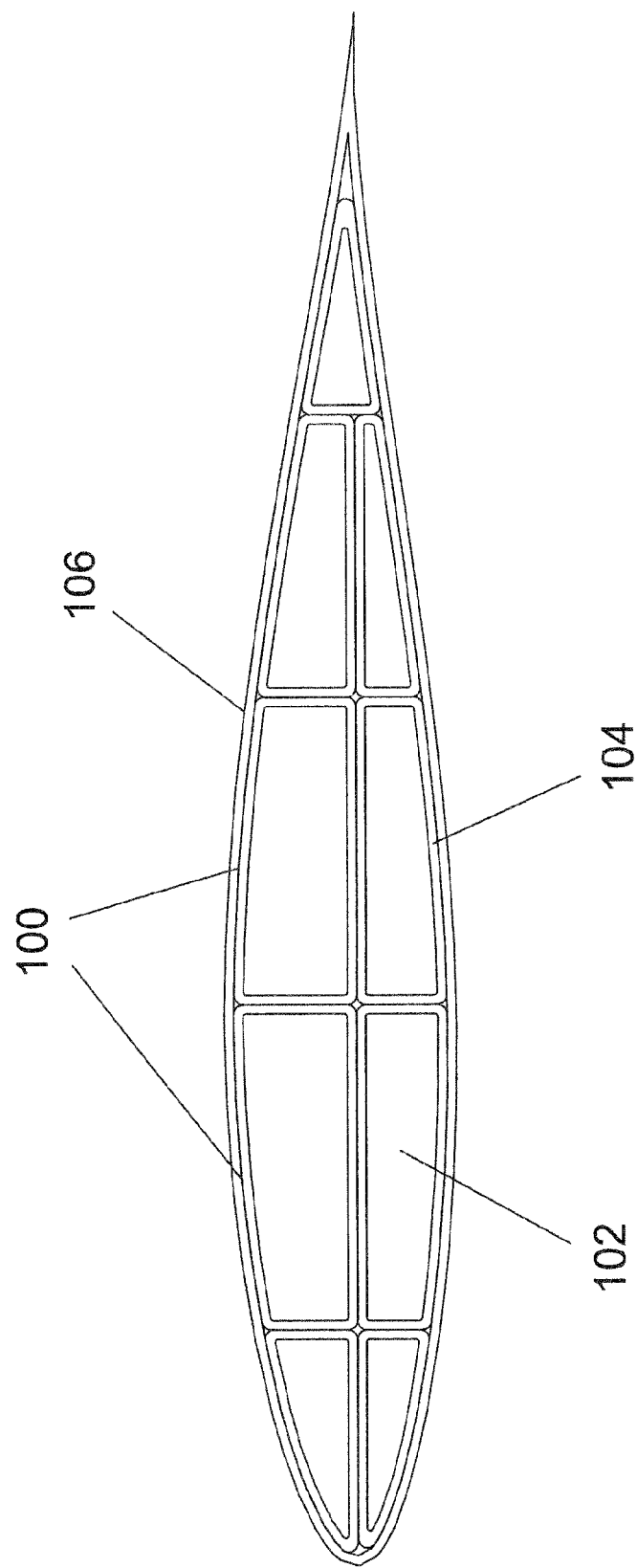
FIG. 1 is a cross section of a wind turbine blade having a plurality of longitudinal composite members.

FIG. 1 illustrates a cross section of a composite wind turbine blade construction comprising a segmented interior enveloped by an outer skin. The wind turbine blade may comprise a plurality of longitudinal composite members 100 each having a fiber and resin layer 104 around a predetermined cross-sectional shape and comprising at least one outer surface and at least one longitudinal mounting surface, each of the outer surfaces of the plurality of longitudinal composite members corresponding to a different portion of a desired airfoil shape, the plurality of longitudinal composite members 100 assembled to form an interior structure 110 such that the outer surfaces of the composite members form at least a majority of the airfoil shape. The longitudinal composite members 100 may be arranged such that the mounting surface of one longitudinal composite member is opposite the mounting surface of an adjacent longitudinal composite member with a fiber and resin layer there between. The longitudinal composite members 100 may have a lightweight core 102 having a predetermined shape, and the fiber and resin layer 104 may comprise fibers braided over the core, or over-braided fibers. The plurality of composite members 100 such as shown in FIG. 1 are aligned side-by-side and bottom-to-top in the interior structure 110 forming a desired cross section for the wind turbine blade. The interior structure 110 may be overlaid with an outer skin 106.

Figure 2:
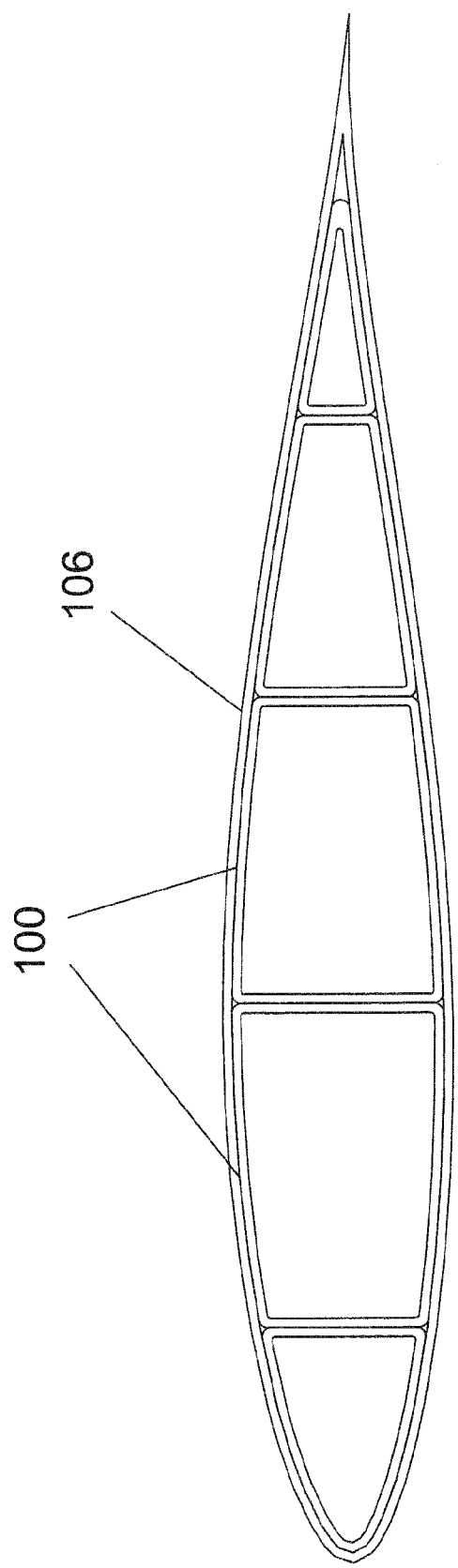
FIG. 2 is a cross section of an alternative wind turbine blade having a plurality of longitudinal composite members.

FIG. 2 illustrates a cross section of an alternative embodiment of the present wind turbine blade. A plurality of longitudinal composite members 100 are aligned side-by-side to form the interior structure 110 forming the cross section off the wind turbine blade. The assembly may be overlaid with outer skin 106.

As shown in FIG. 3, the longitudinal composite members 100 are assembled side-by-side in the transverse direction 112 to form the wind turbine blade interior structure 110.

Figure 4:
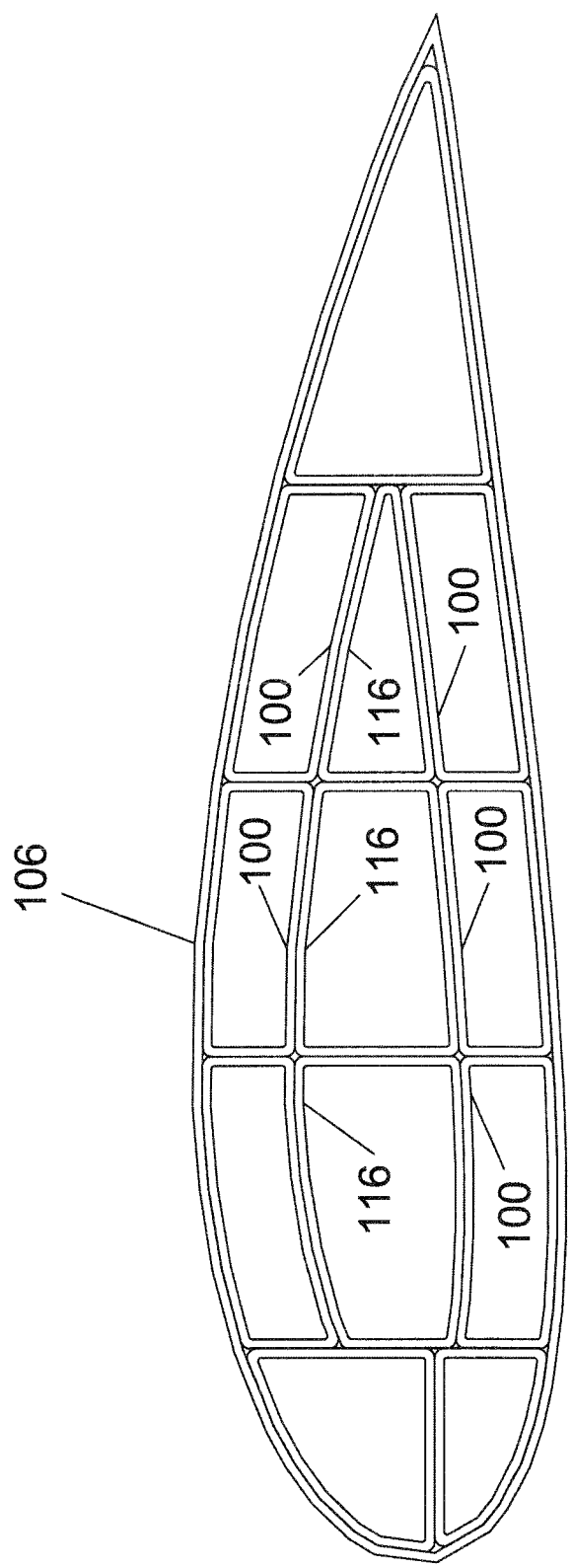
FIG. 4 is a cross section of another alternative wind turbine blade having a plurality of longitudinal composite members and center members.
Figure 5:
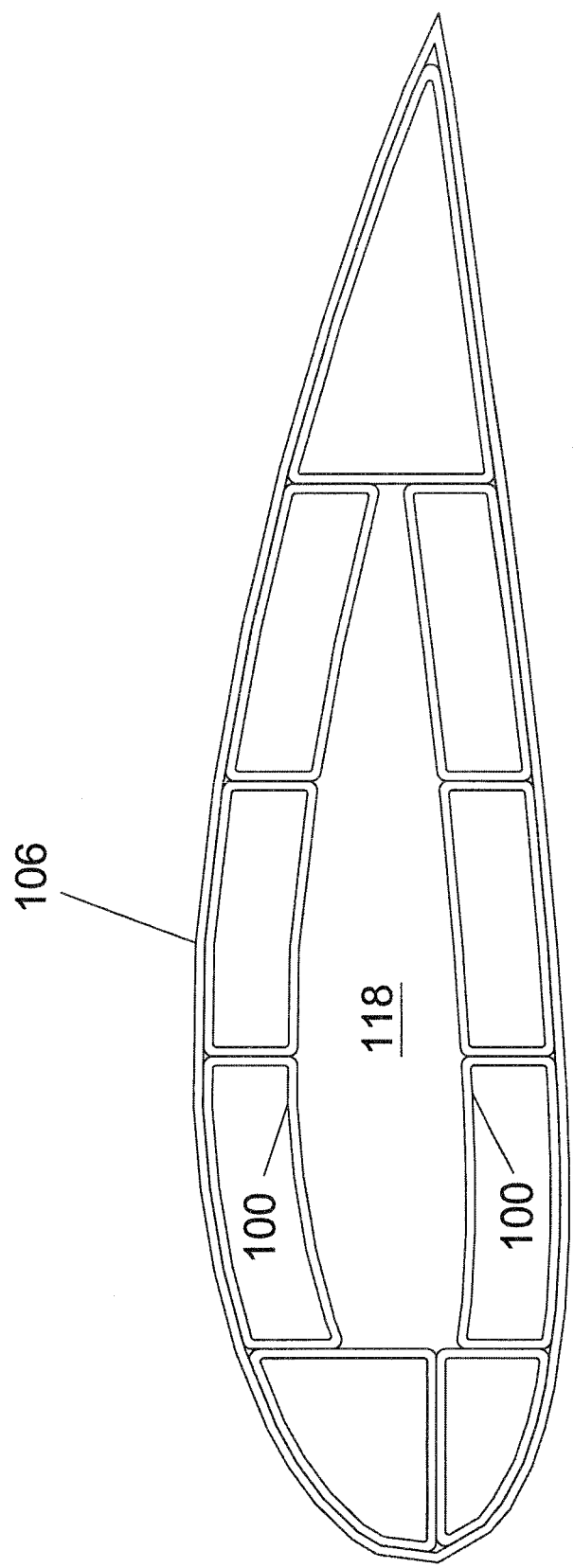
FIG. 5 is a cross section of yet another alternative wind turbine blade having a plurality of longitudinal composite members and a hollow internal area.

The wind turbine blade may have a plurality of longitudinal composite members 100 assembled such that the outer surfaces of the composite members form at least a majority of the airfoil shape, and center members 116 adjoining selected longitudinal composite members 100 in the interior structure, for example such as shown in FIG. 4. Alternatively or in addition, the center members 116 may be adjoining selected longitudinal composite members 100 and/or selected center members 116 in the interior structure. The center members 116 typically have no outer surface and two or more longitudinal mounting surfaces. In the example shown in FIG. 4, the center members 116 have four longitudinal mounting surfaces. Alternatively, the center members 116 may be omitted providing a hollow internal area 118, for example such as shown in FIG. 5.

Figure 6:
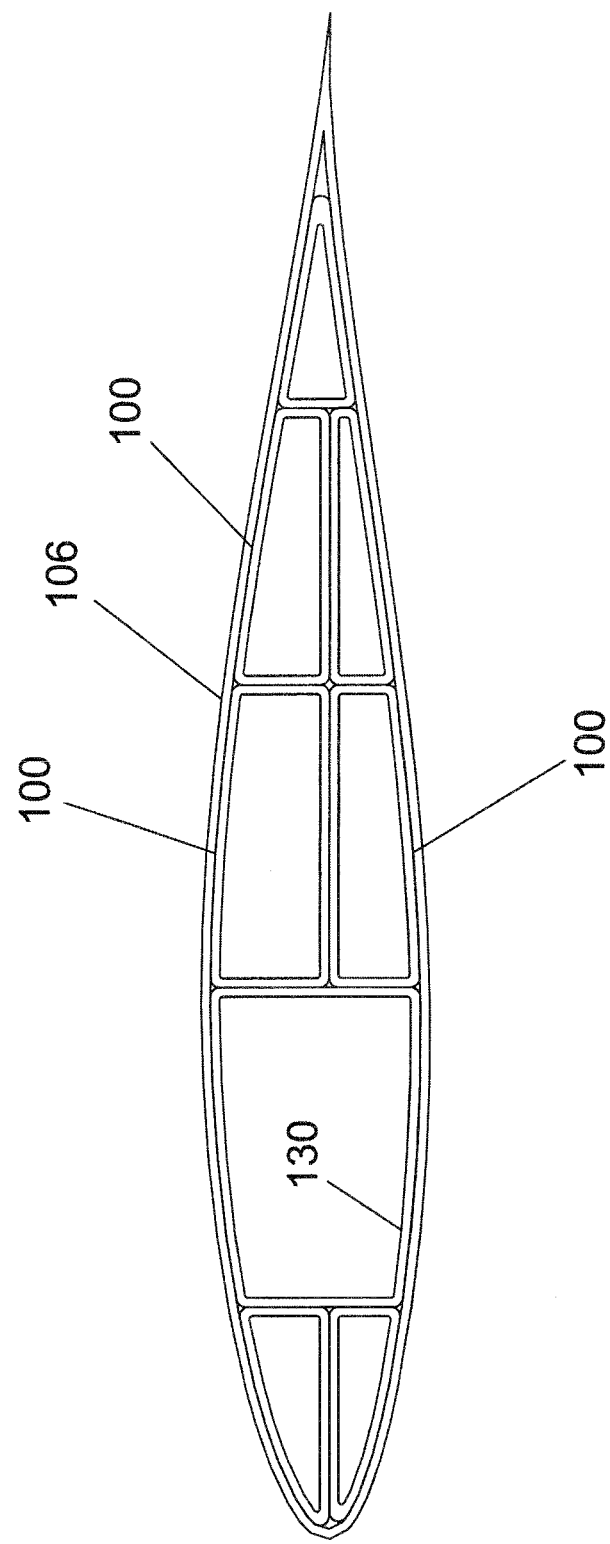
FIG. 6 is a cross section of another alternative wind turbine blade having a plurality of longitudinal composite members and a box spar.

It is contemplated that certain embodiments of the present wind turbine blade will have the interior structure 110 having a plurality of longitudinal composite members 100 without a spar. Referring now to FIG. 6, an alternative wind turbine blade includes a box spar 130 and a plurality of longitudinal composite members 100 to form at least a majority of the airfoil shape. The box spar 130 may be positioned in the wind turbine blade along the length of the wind turbine blade extending from the rotor end of the blade to near the tip. Alternatively, the box spar 130 may be provided extending from the rotor end of the blade along a portion of the length as desired for the structural properties of the wind turbine blade. In one alternative, the box spar may extend along about 30% of the wind turbine blade. Alternatively, the box spar may extend along between about 15% and 40% of the length of the wind turbine blade. In yet another alternative, the box spar may extend along between about 25% and 60% of the length of the wind turbine blade.

The outer surfaces of the plurality of longitudinal composite members 100 correspond to a different portion of a desired airfoil shape such that the outer surfaces of the composite members 100 form at least a majority of the airfoil shape when the longitudinal composite members 100 are assembled in the interior structure 110. As shown in FIGS. 1 and 2, the longitudinal composite members 100 may be assembled in the interior structure 110 forming the desired airfoil shape. Alternatively, one or more portions of longitudinal composite members 100 may be omitted as desired for providing hardware mounting points, and/or for providing mounting areas for movable aerodynamic features such as control surfaces, flaps, and other features, and/or flexible elements for removing ice buildup via inflation/deflation of the flexible elements, and/or other features. Alternatively, one or more portions of longitudinal composite members 100 may be omitted and the outer skin 106 provided to form the desired airfoil shape over the aperture of the omitted member 100.

As shown in FIG. 3, the longitudinal composite members 100 may comprise a plurality of segments joined end-to-end in the longitudinal direction 108 and side-by-side in the transverse direction 112 of the wind turbine blade interior structure 110. The segment end-to-end joints 114 in adjacent composite members may be offset from other end-to-end joints 114 to reduce stress concentrations in the interior structure 110. The composite members are typically of varying cross-section along the longitudinal direction and contoured for the specific location of each member within the interior structure 110. The cross section of longitudinal composite members 100 may vary continuously along the longitudinal direction 108 corresponding to the contours of the wind turbine blade cross section. Alternatively, at least one of the segments comprises a constant cross sectional shape along its length. Alternatively or in addition, the longitudinal composite members 100 may rotate or twist along the length of the member as desired for the wind turbine blade design.

Figure 7:
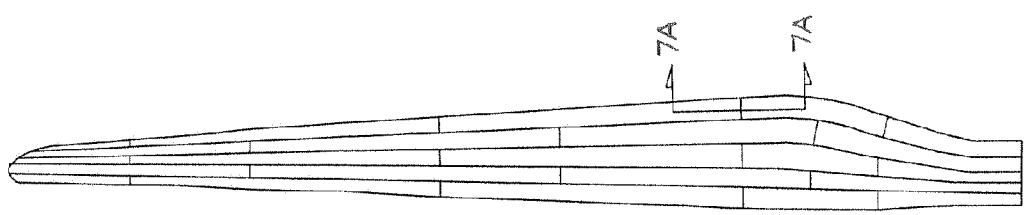
FIG. 7 is a plan view of the internal structure for a wind turbine blade.

The end-to-end joint 114 is shown in FIG. 7. The ends of each segment of the longitudinal composite members 100 in the end-to-end joint 114 are inset or necked to form channels 120 when the composite members 100 are aligned end-to-end. A fiber wrap material 122 is wrapped around both longitudinal composite member ends in the inset channel 120. The fiber wrap material 122 may be a fixed width triaxial braid. Alternatively or in addition, cured composite tubes (not shown) may be used to connect the longitudinal composite members 100 end-to-end. Resin is applied to the over-wrapped fiber wrap material 122 or cured composite tubes to form an over-wrapped joint 124. The over-wrapped joint 124 provides uniform stiffness across the joint when the wind turbine blade structure is cured.

Figure 8A:
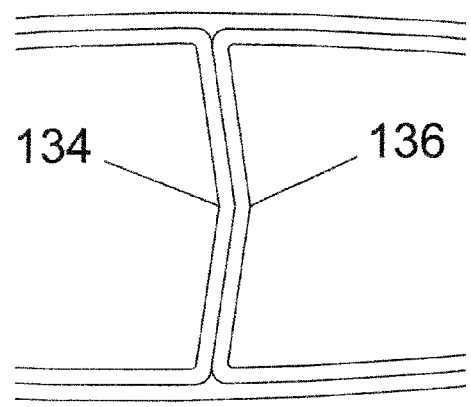
FIGS. 8A and 8B are partial cross sections through adjacent longitudinal composite members having joining features in an alternative of the present disclosure.
Figure 8B:
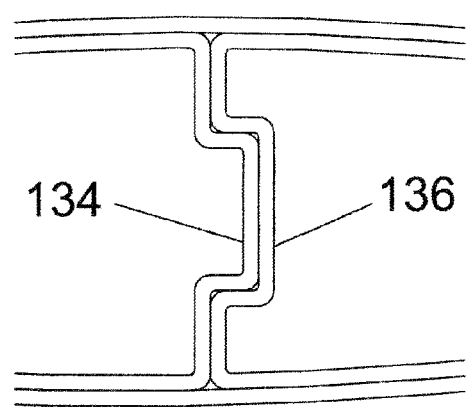

The segments of the longitudinal composite members 100 may include assembly features near the ends of the members for assembling the end-to-end joint 114. The assembly features may form a tongue-and-groove joint, lap joint, dovetail joint, mortise and tenon joint, or other assembly features adapted for joining the segments. Additionally, the composite members 100 may have longitudinal features for joining adjacent members. For example, such as shown in FIGS. 8A and 8B, one longitudinal composite member may include a protruding portion 134 and the adjacent composite member may include a corresponding recess portion 136 for receiving the adjacent protruding portion 134. It is contemplated that other features for joining the composite members may be utilized.

The fiber layer in the fiber and resin layer 104 of the longitudinal composite members 100 may be over-braided onto the core 102 of the longitudinal composite members. Alternatively, the fiber layer may be a prepreg fabric or other fiber fabric for hand lay-up. The fiber layer may be selected according to the position of the member 100 within the interior structure 110 and the structural and bending loads transferred through the member 100. The fiber-reinforced layer 104 may include a braided sleeve having a constant braid bias angle over the length of the longitudinal composite member 100. Alternatively, the braid angle can be varied along the longitudinal direction of the composite member to vary strength and bending properties in portions of the interior structure 110 where desired. The bias angles of the braid may be selected as desired for the structural properties. The bias angle in one direction may be the same as the bias angle in the other direction, for example such as 45°:45°, or 60°:60°. Alternatively, the bias angle in one direction may be different from the bias angle in the other direction, such as 20°:60°, or 60°:20°. In one example, the fiber layer may be a braided sleeve comprising fibers having a bias angle in one direction less than the bias angle in the other direction.

The braided sleeve may be over-braided onto the core 102. Alternatively, the fiber may be a prepreg fabric or other overlaid fiber layer. The fiber and resin layer may comprise glass fiber, carbon fiber, or a combination thereof. It is contemplated that an over-braided sleeve may be useful in allowing designers to predict the structural properties of each over-braided composite member 100 and the entire wind turbine blade structure. Over-braiding onto contoured cores of varying cross section permits precise, repeatable control of fiber paths during manufacture.

For example, the fiber layer of the longitudinal composite members 100 may be an over-braid having biaxial regions selected for desired shear stiffness on the sides of the composite members that will form inner walls after assembly. The over-braid may also include tri-axial regions selected for desired bending stiffness on the outer wall portions of the longitudinal composite members 100. The over-braided fiber may include fibers of different materials, such as carbon and glass, in either or both the bias directions and the axial directions. The bias angles of the over-braided fiber may be varied from one composite member to another to provide each composite member with desired mechanical properties for its location in the wind turbine blade.

Figure 9:
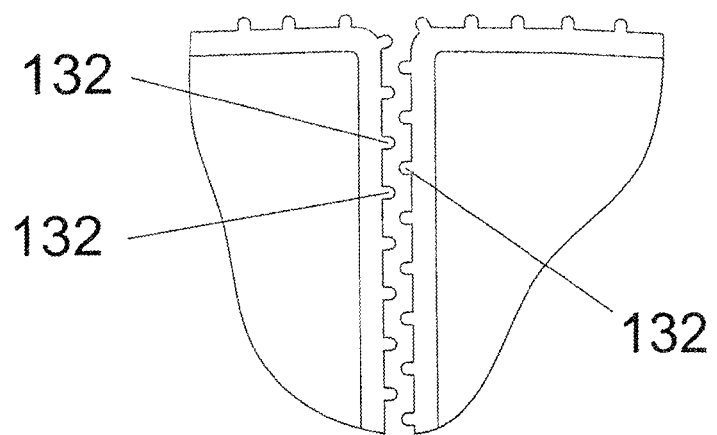
FIG. 9 is a partial cross section through adjacent longitudinal composite members having a fiber layer with axial features in another alternative of the present disclosure.

The longitudinal composite members 100 may be arranged such that the mounting surface of one longitudinal composite member is opposite the mounting surface of an adjacent longitudinal composite member. The fiber and resin layer 104 of each adjacent longitudinal composite member 100 may be joined together as one layer forming the connection, with the fiber layer 104 of each adjacent longitudinal composite member 100 together forming the fiber-reinforcing in the fiber and resin layer between the members 100. In one alternative, the fiber layer may comprise axial features 132 such as axial ridges, stitching, strands, or other features capable of intermeshing with an adjacent fiber layer in the assembly, for example such as shown in FIG. 9. The intermeshing axial features 132 increase the shear strength of the connection between adjoining composite members 100.

In the wind turbine blade structure, the adjoining walls of longitudinal composite members form a plurality of shear web-like and spar-like internal surfaces. The plurality of shear web-like and spar-like internal surfaces share the internal and external loads on the wind turbine blade structure. In certain embodiments, the resulting structure may enable the use of thinner wall sections than the prior thick wall sections typically required in conventional dual shear web/spar cap designs. It is contemplated that the present wind turbine blades will support greater loads within the same aerodynamic envelope. Additionally, the structural properties of the longitudinal composite members can be customized for the specific load environment for its placement in the interior of the wind blade. Various structural analysis techniques may be utilized to customize the fiber structure and braiding parameters of each longitudinal composite member.

The design, materials and structure of the fiber layer in the longitudinal composite members and the continuous outer skin can be varied for a desired set of wind loads without requiring a change in the aerodynamic engineering of the wind blade. These variables can be modified without extensive tooling modifications. The desired fiber layer for the longitudinal composite members and outer skin may be determined and provided at the initial manufacturing facility away from the installation site, allowing a set of generalized fixtures and tooling to be transported to the assembly site. Alternatively, the fiber layer and cross sectional shape of each longitudinal composite member 100 may be varied to customize the wind turbine blade for various conditions.

In one alternative, longitudinal composite members 100 positioned in an area of low structural loads may include a fiber and resin layer 104 having one layer or two layers of biaxial glass fiber. In another alternative, longitudinal composite members 100 positioned in an area of high structural loads may include a fiber-reinforced layer 104 having two layers of biaxial glass fiber and one layer of triaxial carbon fiber. The number of layers of fiber, the orientation of the fibers, and the fiber material in the fiber and resin layer 104 may be selected to accommodate design loads at an efficient cost. Additionally, the number of layers of fiber, the orientation of the fibers, and the fiber material in the fiber and resin layer 104 may be varied along the longitudinal direction of the composite members 100 to accommodate the structural and bending loads of the specific location of each member within the interior structure 110.

Figure 10:
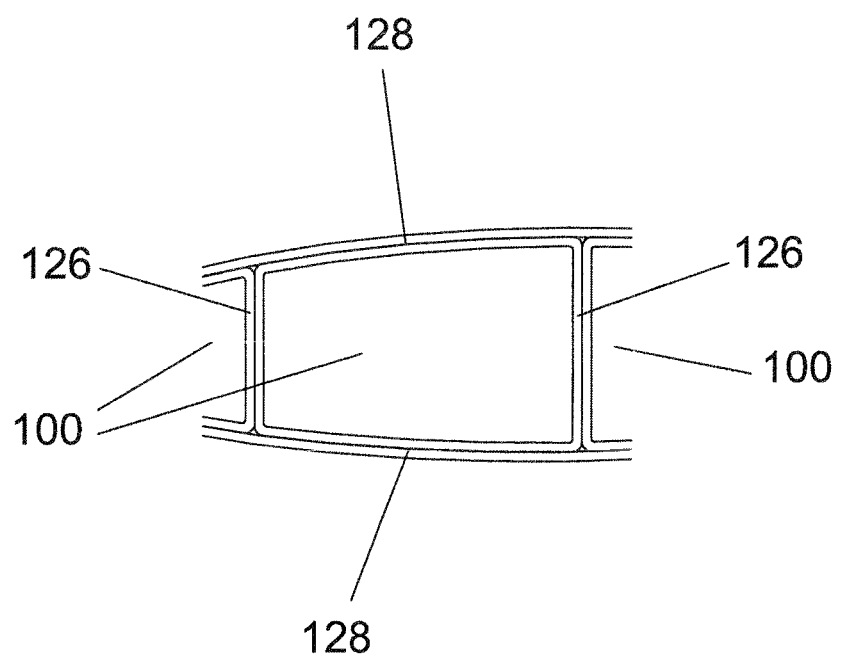
FIG. 10 is a partial cross section of the wind turbine blade of FIG. 2.

In the alternative shown in FIG. 10, the side walls of the longitudinal composite members 100 form inner webs 126. The longitudinal composite members 100 may have a fiber and resin layer including a fiber over-braid having a biaxial braid optimized for shear stiffness. In this alternative, the outer walls 128 formed by the top and bottom of the longitudinal composite members 100 may include a triaxial braid optimized for bending stiffness.

The core 102 of the longitudinal composite member 100 may be foam, such as polyurethane, polyisocyanurate, or other rigid foam. Alternate materials may be used for the cores, including but not limited to materials that can be removed after cure by dissolution, melting or mechanical withdrawal, such as wax cores or inflatable cores. Alternatively, inflatable cores may be used during braiding, resin infusion and cure to maintain the contours of the composite member until the member is cured; after the fiber and resin layer 104 is cured the cores can be deflated and removed.

The plurality of longitudinal composite members 100 are assembled forming the interior structure 110. The composite members 100 may be arranged in one or more fixtures positioned to secure the composite members 100 during assembly. A layer of resin is provided between adjacent composite members 100 to affix the members in the interior structure 110. The longitudinal composite members are adapted for the outer surfaces of the composite members to form at least a majority of the airfoil shape. Unlike prior wind blades, a mold defining the outer shape of the wind blade is not needed with the present structure.

In certain embodiments, transverse members (not shown) may be provided along the interior structure 110 as desired for the structural properties and the geometric design. The transverse members may be constructed in a similar manner to the longitudinal composite members 100. Alternatively, the transverse members may be non-composite components such as aluminum, steel, thermoplastic, or other members as desired.

Composite gusset fillers, commonly called "noodles", can be laid into the interstices formed at the outer edges of adjoining longitudinal composite members 100 to fill the voids with fibers before the outer skin 106 is provided.

After the longitudinal composite members 100 are assembled in the interior structure, 110, the outer skin 106 is provided. The outer skin 106 may be a fiber and resin layer, and may be one or a combination of many constructions, including single biaxial sleeves, contoured braids, slitted broadgoods, prepared pieces, prepreg fabric, and other constructions as desired. In one example, the fiber in the outer skin may be a biaxial glass fiber fabric. Alternatively, the fiber in the outer skin may be a triaxial braided fiber of glass and/or carbon. In yet another alternative, the fiber in the outer skin comprises a continuous, contoured braided sleeve. A continuous, contoured braided sleeve may be used to provide a fiber layer substantially without seams, which may be subject to damage by wind-borne particles, sleet, snow, and bird and bat strikes It is contemplated that for certain embodiments, the interior structure 110 formed of the plurality of longitudinal composite members 100 may be sufficient to accommodate the structural loads of the wind turbine blade. In such alternatives, the outer skin 106 may be a light-weight finish layer. In one alternative, the outer skin is not fiber-reinforced.

The resin used in the fiber and resin layer of the longitudinal composite members 100 may be the same as the resin in the outer skin 106. Alternatively, the resin used in the outer skin 106 may be different from the resin in the fiber and resin layer of the longitudinal composite members 100 as desired for finishing or for structural properties. The resin may be a fiber-reinforced resin, polymer resin, adhesive, or other suitable bonding material, of combinations thereof. The resin may be adapted for curing in ambient air, or at relatively low temperature, simplifying the wind turbine blade assembly in temporary manufacturing facilities. In certain alternatives, the resin may be applied by brush, pour, or spray.

Heating elements may be embedded in the longitudinal composite members 100 along the leading edge to reduce or inhibit icing. Alternatively or additionally, selected longitudinal composite members 100 may be instrumented to monitor the structural health of the assembly in service. In one example, optical fibers or Bragg sensors may be embedded in the fabric layer of the composite member 100 and/or outer skin 106.

A method of manufacturing a wind turbine blade is disclosed including steps of providing a plurality of longitudinal composite members each having a fiber layer around a predetermined cross-sectional shape and comprising at least one outer surface, each of the outer surfaces of the plurality of longitudinal composite members corresponding to a different portion of a desired airfoil shape, and assembling the plurality of longitudinal composite members such that the outer surfaces of the composite members form at least a majority of the airfoil shape. Assembling the plurality of longitudinal composite members may include the steps of infusing resin into the fiber layer around each longitudinal composite member 100, assembling the composite members, and curing the resin to form the interior structure 110. Alternatively, the assembly may include the steps of assembling the composite members, infusing resin into the fiber layer around the longitudinal composite members 100 in the assembly, and curing the resin to form the interior structure 110. In another alternative, prior to the step of assembling the plurality of longitudinal composite members, resin may be infused into the fiber layer around each longitudinal composite member and cured so that each longitudinal composite member 100 comprises a fiber and resin layer prior to assembly into the interior structure. Then, the plurality of longitudinal composite members are assembled using resin to bond the cured members together. In any event, the method may further include the step of providing an outer skin over the assembly of longitudinal composite members, the outer skin comprising a fiber and resin layer.

In one example, segments of the longitudinal composite members 100 comprise an over-braided fiber layer 104 over a lightweight core 102. The joints 114 where the segments meet end-to-end are circumferentially wrapped with composite fibers. The fiber layers of the longitudinal composite members are infused with resin during assembly to form the interior structure 110 of the wind turbine blade. The outer skin 106 is placed over the assembly of composite members, infused with resin and the entire structure is cured to form the wind turbine blade.

The wind turbine blade may be longer than 60 feet in length. Alternatively, the wind turbine blade may be longer than 100 feet in length. In yet another alternative, the wind turbine blade may be approximately 150 feet in length or greater. Transporting long wind turbine blades over a distance can be a difficult, if not insurmountable operation. The present wind turbine blade overcomes one or more transportation problems in the past by enabling assembly of the wind turbine blade at the installation site.

The longitudinal composite members 100 of the present wind turbine blade may be made up of segments having a length suitable for a desired mode of transportation. In one alternative, the segments of the longitudinal composite members 100 are less than about 40 feet in length for containerized shipping. Alternatively, the segments may be less than about 20 feet in length. For certain modes of transportation, such as by rail, the segments may up to about 60 feet in length, or more.

A method of manufacturing the wind turbine blade may include the step of transporting the plurality of segments to a desired location, and assembling the segments to form the plurality of longitudinal composite members. Then, the step of providing an outer skin over the assembly of longitudinal composite members, the outer skin comprising a fiber and resin layer. Due to the relative smaller size of the segmented longitudinal composite members, standard and economical means of transportation may be utilized as compared to prior transportation of completed wind turbine blades or modular wind turbine blades. Additionally, should portions of the longitudinal composite members become damaged in shipping or assembly, the replacement cost of the damaged member is an advantage over the cost of prior wind blade damage during shipping or assembly.

The segments may be transported to a desired location such as the wind turbine installation site, or nearby the installation site. Additionally, the steps of assembling the longitudinal composite members 100 into the interior structure 110 may be accomplished in a temporary structure, such as a temporary building or a tent structure. The temporary structure may be moved as installation of wind turbines moves from place to place, reducing the distance finished wind turbine blades must be transported for installation.

It is contemplated that the present wind turbine blades may be assembled in one or more facilities as desired for the wind turbine design and the installation location. The composite members, outer skin and secondary structural elements may be manufactured at a facility or more than one facility in multiple steps and transported to an assembly site in close proximity to the installation site of the wind turbine. For example, providing the fabric layer over the composite members 100, such as by over-braiding may take place at a first facility, then the composite members 100 or segments of the members 100 may be transported to the installation location for resin infusion, assembly, and curing. Alternatively, the fabric layer over the composite members, such as by overbraiding, resin infusion and curing may be provided at one facility so that the longitudinal composite members 100 having a cured fiber and resin layer can be placed into the interior at an assembly location. Alternatively or in addition, subassemblies of longitudinal composite members or segments thereof can be preassembled at a facility prior to transport to the final assembly location.

The various segments and components that make up a wind turbine blade may be assembled into a kit for efficient transport to an installation site. The kit may comprise a plurality of segments adapted to be joined end to end to form longitudinal composite members, each having a fiber layer around a predetermined cross-sectional shape and comprising at least one longitudinal outer surface, each of the outer surfaces of the plurality of longitudinal composite members corresponding to a different portion of a desired airfoil shape, the plurality of longitudinal composite members capable of being assembled such that the outer surfaces of the composite members form at least a majority of the airfoil shape. The kit may further include a fiber layer comprising a fiber sleeve or fiber overlay material for forming the outer skin 106. The fiber layer may be a continuous, contoured braided sleeve. The longitudinal composite members may be adapted to be assembled by infusing resin into the fiber layer around each of the plurality of longitudinal composite members.

For example, a wind turbine blade having the cross-section of FIG. 1 and interior structure 110 of FIG. 3 may include about 90 segments. The segments, outer skin fiber, assembly fixtures, and resin may be transported in shipping containers to the installation site, where the segments may be assembled into the interior structure 110, and the outer skin 106 provided over the interior structure 110. Alternatively, the kit may include fiber material such as fiber braids, and cores 102 such that the assembly of the longitudinal composite members 100 may be done after shipping to the desired location.

Figure 11:
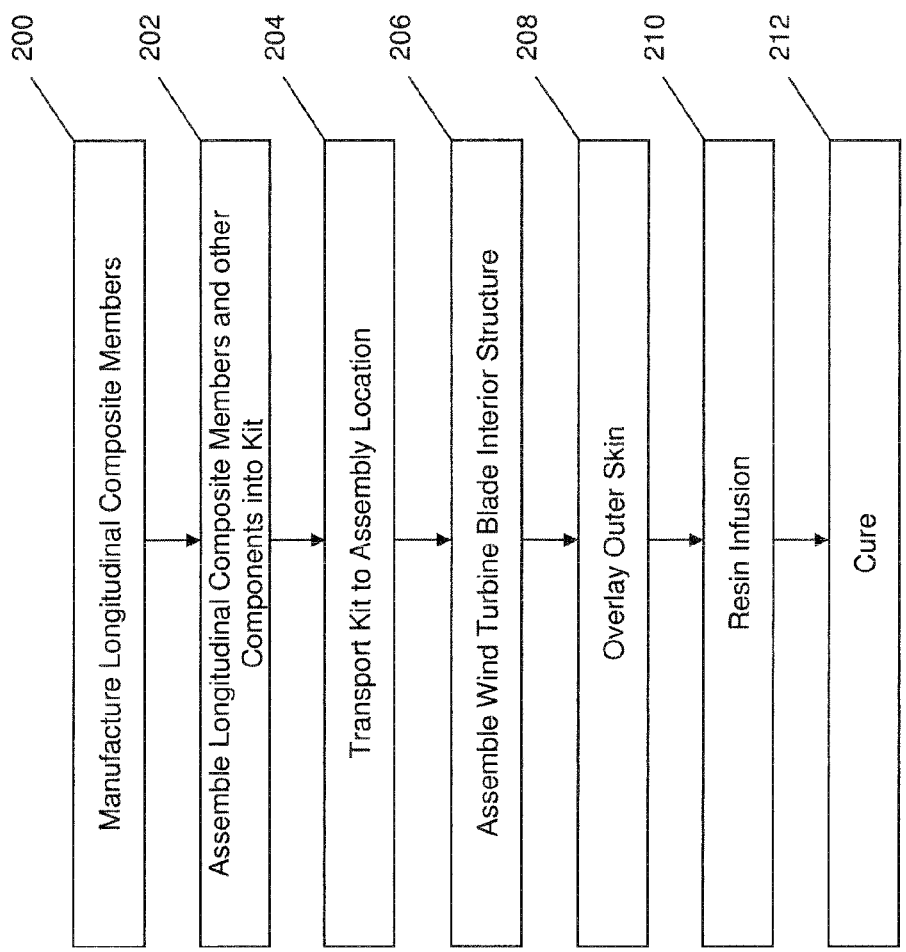
FIG. 11 is a flowchart illustrating the method of manufacturing wind turbine blades employing the present composite construction.

The method for manufacturing wind turbine blades with the construction of the present invention is illustrated via the flowchart in FIG. 11. Step 200 is the manufacture of longitudinal composite members 100 at a primary braiding facility. Additional structural components may be manufactured at the same facility. Additionally, the fiber material for the outer skin 106 may be braided and prepared for the kit. In Step 202, the braided components and any other structural components are assembled in a kit. Step 204 is the transportation of the kit to a wind turbine blade assembly location in close proximity to the wind turbine installation site as desired. In an exemplary embodiment of the present invention the assembly location is adjacent to the wind turbine installation site. Step 206 is the assembly of the wind turbine blade interior structure 110. Resin is applied to the longitudinal composite members 100 and the over-wrapped joints 124. In step 208, the outer skin 106 is overlaid on the wind turbine blade interior structure 110. Resin is infused into the fibers of the outer skin in step 210 and the wind turbine blade structure is cured in step 212. Following step 212, local machining and/or handwork needed may be performed and the completed wind turbine blade assembled onto the rotor.

Various assembly fixtures may be used to facilitate assembly of the wind turbine blade. In one embodiment, an open composite structural framework may be provided to hold the longitudinal composite members 100 in place during assembly, and remains in place beneath the outer skin 106 to supply additional load-carrying capabilities in the structure. In this embodiment, the longitudinal composite members may comprise recesses corresponding to the structural framework such that the structural framework forms integral portions of the interior structure 110. In one alternative, the elements of the framework can serve as gusset fillers.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A wind turbine blade comprising
   a plurality of longitudinal composite members each having a fiber and resin layer around a predetermined cross-sectional shape and each comprising at least one longitudinal outer surface and at least one longitudinal mounting surface,
   each of the outer surfaces of the plurality of longitudinal composite members corresponding to a different portion of a desired airfoil shape,
   the plurality of longitudinal composite members assembled to form an interior structure of the wind turbine blade such that the outer surfaces of the composite members form at least a majority of the airfoil shape; and
   wherein the fiber layer of the longitudinal composite members comprises axial features capable of intermeshing with an adjacent fiber layer in the assembly.

2. The wind turbine blade of claim 1 where the mounting surface of one longitudinal composite member is opposite the mounting surface of an adjacent longitudinal composite member with a fiber and resin layer there between.

3. The wind turbine blade of claim 1 further comprising:
   the fiber and resin layer of the longitudinal composite members comprising a braided sleeve comprising fibers selected from a group consisting of glass fiber, carbon fiber, and a combination thereof.

4. The wind turbine blade of claim 1 further comprising:
   the fiber and resin layer of the longitudinal composite members comprising a braided sleeve comprising fibers having a bias angle in one direction less than the bias angle in the other direction.

5. The wind turbine blade of claim 1 further comprising:
   the fiber and resin layer of the longitudinal composite members comprising a triaxial braided sleeve.

6. The wind turbine blade of claim 1 further comprising:
   an outer skin over the assembly of longitudinal composite members comprising a fiber and resin layer.

7. The wind turbine blade of claim 6 where the fiber in the outer skin comprises a continuous, contoured braided sleeve.

8. The wind turbine blade of claim 1 where at least one of the plurality of longitudinal composite members comprises a variable cross section along its length.

9. The wind turbine blade of claim 1 where each of the longitudinal composite members comprises a plurality of segments joined end to end.

10. The wind turbine blade of claim 9 where at least one of the segments comprises a constant cross sectional shape along its length.

11. The wind turbine blade of claim 9 where the segments of the longitudinal composite members are less than about 40 feet in length.

\* \* \* \* \*